(12) United States Patent
Zhang et al.

(10) Patent No.: US 11,397,827 B2
(45) Date of Patent: Jul. 26, 2022

(54) EVM-BASED TRANSACTION PROCESSING METHOD, DEVICE, PROGRAM AND MEDIUM

(71) Applicant: BEIJING BAIDU NETCOM SCIENCE AND TECHNOLOGY CO., LTD., Beijing (CN)

(72) Inventors: Lei Zhang, Beijing (CN); Bingxin Fan, Beijing (CN); Qi Zheng, Beijing (CN); Wei Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/443,105

(22) Filed: Jul. 20, 2021

(65) Prior Publication Data

US 2021/0350019 A1 Nov. 11, 2021

(30) Foreign Application Priority Data

Dec. 24, 2020 (CN) .......................... 202011547907.1

(51) Int. Cl.
*G06F 16/23* (2019.01)
*G06F 16/25* (2019.01)
*G06F 21/62* (2013.01)

(52) U.S. Cl.
CPC ...... *G06F 21/6227* (2013.01); *G06F 16/2365* (2019.01); *G06F 16/252* (2019.01)

(58) Field of Classification Search
CPC . G06F 21/6227; G06F 16/2365; G06F 16/252
(Continued)

(56) References Cited

U.S. PATENT DOCUMENTS

2019/0238327 A1 8/2019 Li et al.
2020/0005292 A1* 1/2020 Mao ..................... G06F 16/258
(Continued)

FOREIGN PATENT DOCUMENTS

CN 106598490 A 4/2017
CN 108765158 A 11/2018
(Continued)

OTHER PUBLICATIONS

Li, F., Research on the Progress in Cross-chain Technology of Blockchains, Journal of Software, vol. 30, No. 6, 2019, 12 pages.
(Continued)

*Primary Examiner* — Joshua Bullock
(74) *Attorney, Agent, or Firm* — Hunton Andrews Kurth LLP

(57) ABSTRACT

Provided are an Ethereum Virtual Machine-based transaction processing method and apparatus, a device, a program and a medium, which relate to the field of computer technologies and, in particular, to blockchain technologies. An implementation scheme includes: acquiring, by a virtual machine instance running in a blockchain node, a to-be-processed transaction request; generating, by the virtual machine instance, a data access request for target access data and transmitting the data access request to an interface module in a process of executing the to-be-processed transaction request; performing, by the interface module, instruction conversion according to the data access request to determine a blockchain access interface corresponding to a function of the data access request; and calling, by the interface module, the blockchain access interface for a data storage space of a blockchain to access the target access data and feeding back an access result to the virtual machine instance.

19 Claims, 4 Drawing Sheets

(58) Field of Classification Search
USPC .......................................................... 726/30
See application file for complete search history.

(56) References Cited

U.S. PATENT DOCUMENTS

| | | | | |
|---|---|---|---|---|
| 2020/0201838 | A1* | 6/2020 | Ciocarlie | G06F 16/2365 |
| 2021/0103603 | A1* | 4/2021 | Iftemi | G06F 16/219 |
| 2021/0304191 | A1* | 9/2021 | O'Grady | G06F 9/3877 |
| 2021/0398211 | A1* | 12/2021 | Maathur | G06Q 20/401 |

FOREIGN PATENT DOCUMENTS

| | | |
|---|---|---|
| CN | 109492053 A | 3/2019 |
| CN | 110297689 A | 10/2019 |
| CN | 110321374 A | 10/2019 |
| CN | 111095338 A | 5/2020 |
| CN | 111381938 A | 7/2020 |
| CN | 111651169 A | 9/2020 |
| CN | 111741026 A | 10/2020 |
| KR | 102008001 B1 | 8/2019 |

OTHER PUBLICATIONS

Fan, J., et al., Survey on Smart Contract Based on Blockchain System, Computer Science, vol. 46, No. 11, Nov. 2019, 10 pages.

First Chinese Office Action issued from The State Intellectual Property Office of People's Republic of China to CN Application No. 202011547907.1 dated Feb. 10, 2021, 13 pages.

Second Chinese Office Action issued from The State Intellectual Property Office of People's Republic of China to CN Application No. 202011547907.1 dated Mar. 5, 2021, 7 pages.

"Chavady, G.J., "A Study of Oracle Systems for the QTUM Blockchain Eco-system," A Dissertation, Aug. 2020, 84 pages.".

"Extended European Search Report issued from the European Patent Office to EP Application No. 21187694.1 on Jan. 21, 2022, 17 pages."

"Kwon, J., et al., "Cosmos," A Network of Distributed Ledgers, Jan. 30, 2019, pp. 1-42, 42 pages."

"Liu, X., et al., "Elastic and cost-effective data carrier architecture for smart contract in blockchain," Future Generation Computer Systems, vol. 100, Nov. 1, 2019, pp. 590-599, 10 pages."

"Scheid, E., et al., "Toward a Policy-based Blockchain Agnostic Framework," International Symposium on Integrated Network Management, pp. 609-613, Apr. 8, 2019, 6 pages."

"Spoke, M. , et al., "Aion: Enabling the decentralized Internet," Nuco, Inc., Jul. 31, 2017, pp. 1-22, 24 pages."

"Wöhrer, M., et al., "Design Patterns for Smart Contracts in the Ethereum Ecosystem," University of Vienna, Faculty of Computer Science, pp. 1513-1520, Jul. 30, 2018, 8 pages."

\* cited by examiner

EVM-BASED TRANSACTION PROCESSING METHOD, DEVICE, PROGRAM AND MEDIUM

CROSS-REFERENCE TO RELATED APPLICATION(S)

This application claims priority to Chinese Patent Application No. 202011547907.1 filed on Dec. 24, 2020, the disclosure of which is incorporated herein by reference in its entirety.

TECHNICAL FIELD

The present application relates to the field of computer technologies and, in particular, blockchain technologies. Specifically, the present application relates to an Ethereum Virtual Machine (EVM)-based transaction processing method, a device, a program and a medium.

BACKGROUND

A blockchain is a new application mode of computer technologies such as distributed data storage, point-to-point transmission, a consensus mechanism and an encryption algorithm. Being public, transparent and non-tamperable, the blockchain is more and more widely applied in the fields of finance, traceability, insurance and the like.

Blockchain technologies are continuously developed from the earliest bitcoin system to Ethereum. In recent years, many blockchain systems using better technologies have emerged gradually, for example, new blockchain technologies based on the Proof of Stake (PoS) consensus mechanism, such as Polkadot and Cosmos. In the field of blockchain applications, regardless of continuously upgraded and updated technologies, the ecological environment based on Ethereum technologies has already possessed a certain scale. Many blockchain applications are constructed based on smart contracts of Ethereum. Application developers and users are somewhat accustomed to using the smart contracts of Ethereum.

However, with technological progress, some deficiencies of Ethereum have been exposed, such as an inefficient consensus algorithm, so that the deal performance of Ethereum is insufficient to support large-scale commercial application scenarios. Considering the ecological effect of Ethereum, Ethereum cannot be directly discarded and a system capable of being compatible with Ethereum and other blockchain technologies is more in demand. The smart contracts of Ethereum are implemented based on Ethereum Virtual Machines (EVMs) so that the migration of EVMs to another blockchain system needs to be achieved for compatibility with Ethereum and other blockchain technologies.

SUMMARY

The present disclosure provides an Ethereum Virtual Machine-based transaction processing method and apparatus, a device, a program and a medium.

According to the present disclosure, an Ethereum Virtual Machine-based transaction processing method is provided. The method is applied to a blockchain node and includes steps described below.

A virtual machine instance running in the blockchain node acquires a to-be-processed transaction request.

In a process of executing the to-be-processed transaction request, the virtual machine instance generates a data access request for target access data and transmits the data access request to an interface module. The data access request includes a data read request and/or a data write request.

The interface module performs instruction conversion according to the data access request to determine a blockchain access interface corresponding to a function of the data access request.

The interface module calls the blockchain access interface for a data storage space of a blockchain to access the target access data and feeds back an access result to the virtual machine instance.

According to the present disclosure, an Ethereum Virtual Machine-based transaction processing apparatus is further provided. The apparatus is applied to a blockchain node and includes a to-be-processed transaction request acquisition module, a data access request generation and transmission module, an instruction conversion module and a blockchain access interface calling module.

The to-be-processed transaction request acquisition module is configured to cause a virtual machine instance running in the blockchain node to acquire a to-be-processed transaction request.

The data access request generation and transmission module is configured to cause the virtual machine instance to: in a process of executing the to-be-processed transaction request, generate a data access request for target access data and transmit the data access request to an interface module, where the data access request includes a data read request and/or a data write request.

The instruction conversion module is configured to cause the interface module to perform instruction conversion according to the data access request to determine a blockchain access interface corresponding to a function of the data access request.

The blockchain access interface calling module is configured to cause the interface module to call the blockchain access interface for a data storage space of a blockchain to access the target access data and feed back an access result to the virtual machine instance.

According to the present disclosure, an electronic device is further provided. The electronic device includes at least one processor and a memory communicatively connected to the at least one processor.

The memory stores an instruction executable by the at least one processor, and the instruction is executed by the at least one processor to enable the at least one processor to perform the Ethereum Virtual Machine-based transaction processing method of any one of embodiments of the present disclosure.

According to the present disclosure, a non-transitory computer-readable storage medium is further provided, which stores a computer instruction configured to cause a computer to perform the Ethereum Virtual Machine-based transaction processing method of any one of embodiments of the present disclosure.

According to the present disclosure, a computer program product is further provided. The computer program product includes a computer program which, when executed by a processor, implements the Ethereum Virtual Machine-based transaction processing method of any one of embodiments of the present disclosure.

The migration of an Ethereum Virtual Machine to another blockchain system is achieved and the compatibility with Ethereum and other blockchain technologies is improved according to the technologies of the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present scheme and not to limit the present application. In the drawings.

DETAILED DESCRIPTION

Figure 1:
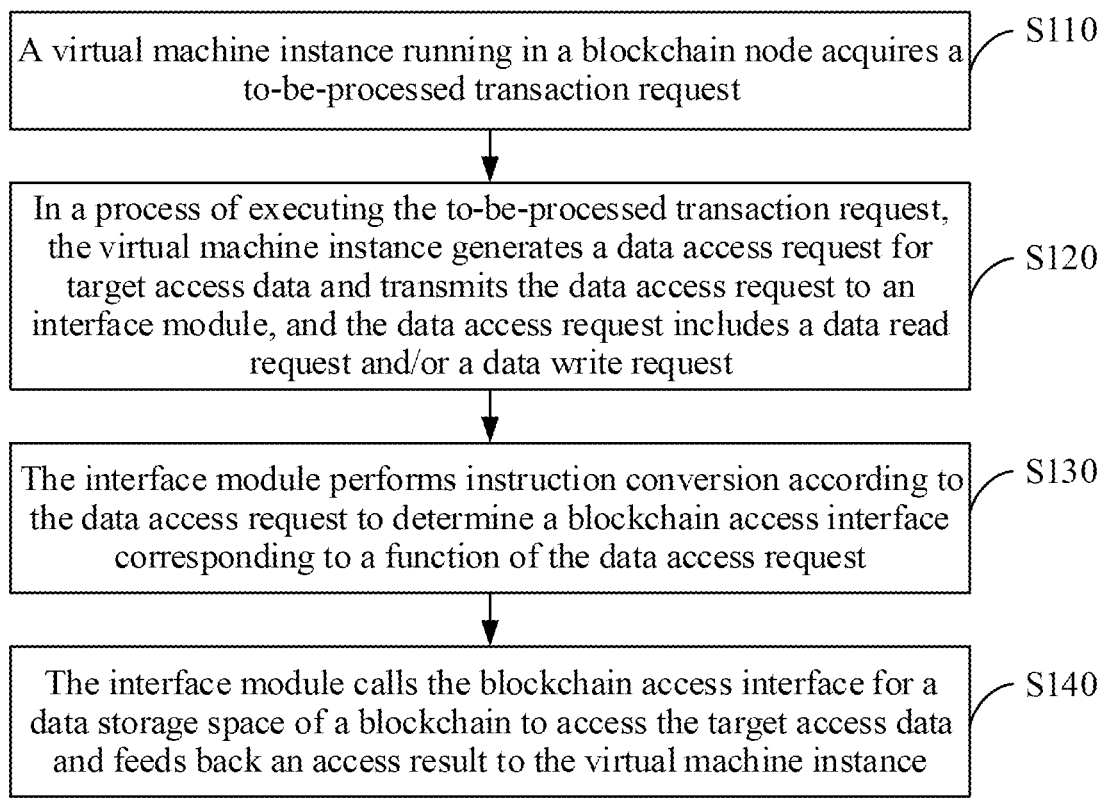
FIG. 1 is a schematic diagram of an Ethereum Virtual Machine-based transaction processing method according to an embodiment of the present disclosure.

Example embodiments of the present application, including details of embodiments of the present application, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

The blockchain is the new application mode of computer technologies such as distributed data storage, point-to-point transmission, the consensus mechanism and the encryption algorithm. A blockchain appearing earliest is an important concept of bitcoins and essentially a decentralized database. As an underlying technology of bitcoins, the blockchain is a series of data blocks generated in association with each other by using a cryptographic method, where each data block contains information about a batch of bitcoin network deals and is used for verifying the validity of the information and generating the next block. Because of being public, transparent and non-tamperable, the blockchain is more and more widely applied in the fields of finance, traceability, insurance and the like. In particular, the blockchain can achieve efficient cooperation between various financial institutions in the field of finance.

The blockchain technology appears earliest in the age of digital currency represented by bitcoins. With the continuous development of the blockchain technology, Ethereum combining the digital currency with smart contracts emerges. The blockchain was upgraded from an original "global ledger" to a "global computer" and is the decentralization of the entire market. Ethereum is an application that combines the digital currency with the smart contracts and optimizes a wider range of scenarios and flows in the field of finance. The biggest upgrade is the presence of smart contracts. Ethereum is located on an application platform on which the smart contracts can be uploaded and executed, and the execution of contracts can be effectively guaranteed.

Large-scale commercial application scenarios tend to be supported by an efficient consensus algorithm. However, the consensus of early blockchain technologies such as bitcoins and Ethereum results in insufficient deal performance to support these scenarios. In the field of blockchain applications, the ecology of Ethereum is of greatest significance, and thus many blockchain applications depend on the ecology of Ethereum. Not only Crypt® Kitties in the field of games but also Dai, a decentralized finance (DeFi) project, in the field of finance are constructed based on the smart contracts of Ethereum.

A virtual machine specifically used for executing the smart contracts of Ethereum is referred to as an Ethereum Virtual Machine (EVM). The smart contracts of Ethereum may be written in languages such as Solidity and Viper. The smart contracts of Ethereum and EVMs are widely applied in the field of blockchains and have become one of factual standards in the field of blockchain smart contracts.

If the EVM is applied in another blockchain system based on a modification of source codes of Ethereum, the EVM is inherently bound to a blockchain data storage mode and access mode so that a migration scheme is not universal and the migrated EVM is more bound to the chain itself and difficult to be applicable to the migration of the EVM to another chain.

The present application provides an Ethereum Virtual Machine-based transaction processing method. A modular design is integrated and an Ethereum Virtual Machine is migrated as a module into a modular blockchain system, for example, a blockchain to which the modular design is introduced, such as XuperChain and Cosmos so that block data is isolated from execution logics. The method in the embodiment of the present application can make full use of the technical ecology and application ecology of Ethereum, which greatly facilitates the application migration of various decentralized applications (Dapps) in the ecology of Ethereum. Meanwhile, the method can also exploit the technical advantages of other blockchain systems to the full.

FIG. 1 is a schematic diagram of an Ethereum Virtual Machine-based transaction processing method according to an embodiment of the present application. This embodiment is applicable to the case where an Ethereum Virtual Machine is migrated to another blockchain system for transaction processing, so as to achieve the migration of the Ethereum Virtual Machine to another blockchain system and improve the compatibility with Ethereum and other non-Ethereum blockchain technologies. The Ethereum Virtual Machine-based transaction processing method disclosed in this embodiment may be executed by an Ethereum Virtual Machine-based transaction processing apparatus. The apparatus may be implemented by software and/or hardware and configured in an electronic device having computing and storage functions. The electronic device is a blockchain node. A blockchain network is a network composed of multiple blockchain nodes and running in a distributed mode. The method provided by the embodiment of the present application may be performed by any blockchain node.

Referring to FIG. 1, the Ethereum Virtual Machine-based transaction processing method provided in this embodiment includes steps described below.

In S110, a virtual machine instance running in the blockchain node acquires a to-be-processed transaction request.

The blockchain node is deployed with a virtual machine program. In response to a running requirement, one or more virtual machine instances may be created for executing computing logics of a smart contract based on an instruction set of the Ethereum Virtual Machine.

The to-be-processed transaction request is a transaction request sent by another blockchain node or submitted by a user at the blockchain node for operations on data on a blockchain. In an embodiment of the present application, the transaction request may be any transaction request supported in the blockchain system and may be a business transaction request, a management transaction request or the like. The to-be-processed transaction request may be a data read request, a data write request or the like for the data on the blockchain.

After acquiring the to-be-processed transaction request, the blockchain node executes the to-be-processed transaction request by running the virtual machine instance.

In S120, in a process of executing the to-be-processed transaction request, the virtual machine instance generates a data access request for target access data and transmits the data access request to an interface module. The data access request includes a data read request and/or a data write request.

In the embodiment of the present application, since a target blockchain system to which the virtual machine is migrated does not support blockchain data to be read and written through a virtual machine instruction, the interface module is provided to parse and convert the data access request expressed through an instruction by the virtual machine instance so that an interface capable of accessing the blockchain data is formed.

In the process of acquiring the to-be-processed transaction request and initiating execution, the virtual machine instance generally generates a requirement for reading/writing (accessing) the blockchain data. A data storage space for storing data is provided in the blockchain system. The data is divided into on-chain data and local data. The on-chain data refers to data added to blocks and stored by each node. The local data is data stored locally by each node according to the content of the on-chain data and a local index requirement. The local data stored by each node may be different. The target access data refers to data involved by the to-be-processed transaction request and may be on-chain data or local data. The data access request is a request for accessing the target access data.

The data access request includes the data read request and/or the data write request. The data read request refers to reading the target access data from the data storage space of the blockchain, and the data write request refers to writing the target access data into the data storage space of the blockchain.

The virtual machine instance of Ethereum has a set instruction set and generates an instruction to read/write data in the process of executing the to-be-processed transaction request, so as to express the data access request.

In S130, the interface module performs instruction conversion according to the data access request to determine a blockchain access interface corresponding to a function of the data access request.

The interface module is configured to perform the instruction parse and conversion on the data access request. The interface module is provided with multiple blockchain access interfaces for implementing various reading and writing functions for data in the data storage space. An interface is actually a program that is capable of performing data reading, writing, computing or the like once or more times and is also capable of calling another interface according to a set program.

Since the data access request generated by the virtual machine instance is in the form of an Ethereum Virtual Machine instruction and cannot be directly identified by a data storage system that does not support Ethereum, the interface module needs to perform the instruction conversion on a data access instruction.

Different data access requests differ in terms of operations on on-chain data in that functions corresponding to the data access requests are different. Therefore, different data access requests may correspond to different blockchain access interfaces. In an embodiment, when the data access requests are the data read request and the data write request, the data access requests correspond to different blockchain access interfaces, respectively.

In S140, the interface module calls the blockchain access interface for the data storage space of the blockchain to access the target access data and feeds back an access result to the virtual machine instance.

The target access data exists in the data storage space of the blockchain. Different data structures may be supported in the data storage space, and the data structures are determined by settings of the blockchain system itself. For example, in the blockchain system, accounts, logs or transaction data records, smart contracts and the like generally need to be set and rights data and the like may also be set. The target access data may have any data structure for accessing.

In an embodiment, the target access data includes account data and contract data.

It will be appreciated that external accounts and contract accounts are typically set in Ethereum. An external account is an account controlled by a key. A contract account is an account controlled by a contract code. The external account and the contract account each include basic on-chain data of each account. Contract data in the contract account refers to data related to a smart contract. No contract data exists in the external account. Both the contract account and the external account are stored in the data storage space of the blockchain.

In an embodiment, the data storage space of the blockchain includes an account space and a contract space. The account space is used for storing account data in the external account and account data in the contract account. The contract space is used for storing the contract data in the contract account. The target access data includes the account data and/or the contract data.

In the case where the Ethereum Virtual Machine is migrated to another blockchain system, if the target blockchain system of migration does not support the contract account including a smart contract code, in an exemplary embodiment, the account space and the contract space are separately provided in the data storage space to store two different types of data in isolation.

Since the account data exists in both the external account and the contract account in Ethereum, and the external account differs from the contract account in that the contract account includes the contract data in addition to the account data, in order to store the account data and the contract data in isolation, the account data in the external account and the account data in the contract account are stored in the account space, and the contract data in the contract account is stored alone in the contract space.

In an embodiment, the data storage space of the blockchain is used for supporting operations on data in at least two types of accounts, and account data in each of the accounts uses the same data structure.

The virtual machine instance generates the data read request and/or the data write request for the data in the data storage space of the blockchain in the process of executing the to-be-processed transaction request for transaction data, that is, a data access operation performed on data in the external account and the contract account in the data storage space of the blockchain. The external account uses the same data structure as the contract account in the data storage space. In an embodiment, both the external account and the contract account are stored through a data structure of an account type.

In an embodiment, the account data includes an account identifier, a deal sequence number, an account public key and a token.

Exemplarily, in the data storage space of the blockchain, the account data in the contract account and the external account may be stored using the following data structure:

```
type AccountData struct {
    Address string
    Sequence uint
    Pubkey string
    Balance uint }
``` where Address denotes the account identifier, Sequence denotes the deal sequence number, Pubkey denotes the account public key, and Balance denotes the token. The account identifier is a data call identifier of account data and may be an account address or an account name, and different account data has different account identifiers. The deal sequence number refers to data for recording the number of times deals have been made. The account public key refers to a public key for encrypting an account. The token refers to a certificate of rights and interests in a digital form and represents an inherent and intrinsic value. The token is capable of representing all certificates of rights and interests that can be digitalized. Exemplarily, the token may be a certificate of rights and interests such as currents, bonds, account items, ownership, or qualifications.

The account data in the contract account and the account data in the external account have the same data structure, which reduces the difficulty in performing data operations between blockchains and reduces the difficulty of migration between blockchains.

In this manner, the storage of the account data and the contract data in isolation can be achieved so that the compatibility of data structures stored in different blockchain systems can be improved.

By calling the blockchain access interface, the interface module can implement an access operation on the target access data in the account space and the contract space of the blockchain, that is, a read operation and/or a write operation on the account data and the contract data are implemented and the access result corresponding to the target access data is obtained. The interface module feeds back the access result to the virtual machine instance. The access result may be read data, or an access state of an access success or failure may be fed back.

Of course, it will be appreciated by those skilled in the art that when the Ethereum Virtual Machine is migrated to a different blockchain system, different blockchain systems have different data storage structures and data storage manners which can coordinate, and the storage manners of the blockchain systems are adjusted based on the storage manner of the Ethereum Virtual Machine to achieve the compatibility. Alternatively, the data access manner of the Ethereum Virtual Machine matches the data storage manner of the blockchain system through conversion by the interface module, that is, data access is performed according to the data storage structures, paging manners and the like of the blockchain system. The design of an access interface may be set according to the data storage manner of the blockchain system.

According to the technical scheme in the embodiment of the present application, when the Ethereum Virtual Machine is migrated to another blockchain system for transaction processing, the interface module is constructed to perform the instruction conversion on the data access request in the form of the Ethereum Virtual Machine instruction and determine the blockchain access interface corresponding to the function of the data access request so that a heterogeneous data storage space can be accessed. Therefore, the blockchain is open and componentized, thereby reducing the difficulty in migrating the Ethereum Virtual Machine to another blockchain system. The embodiment of the present application achieves the migration of the Ethereum Virtual Machine to another blockchain system and improves the compatibility with Ethereum and other blockchain technologies through the construction of the interface module.

Figure 2:
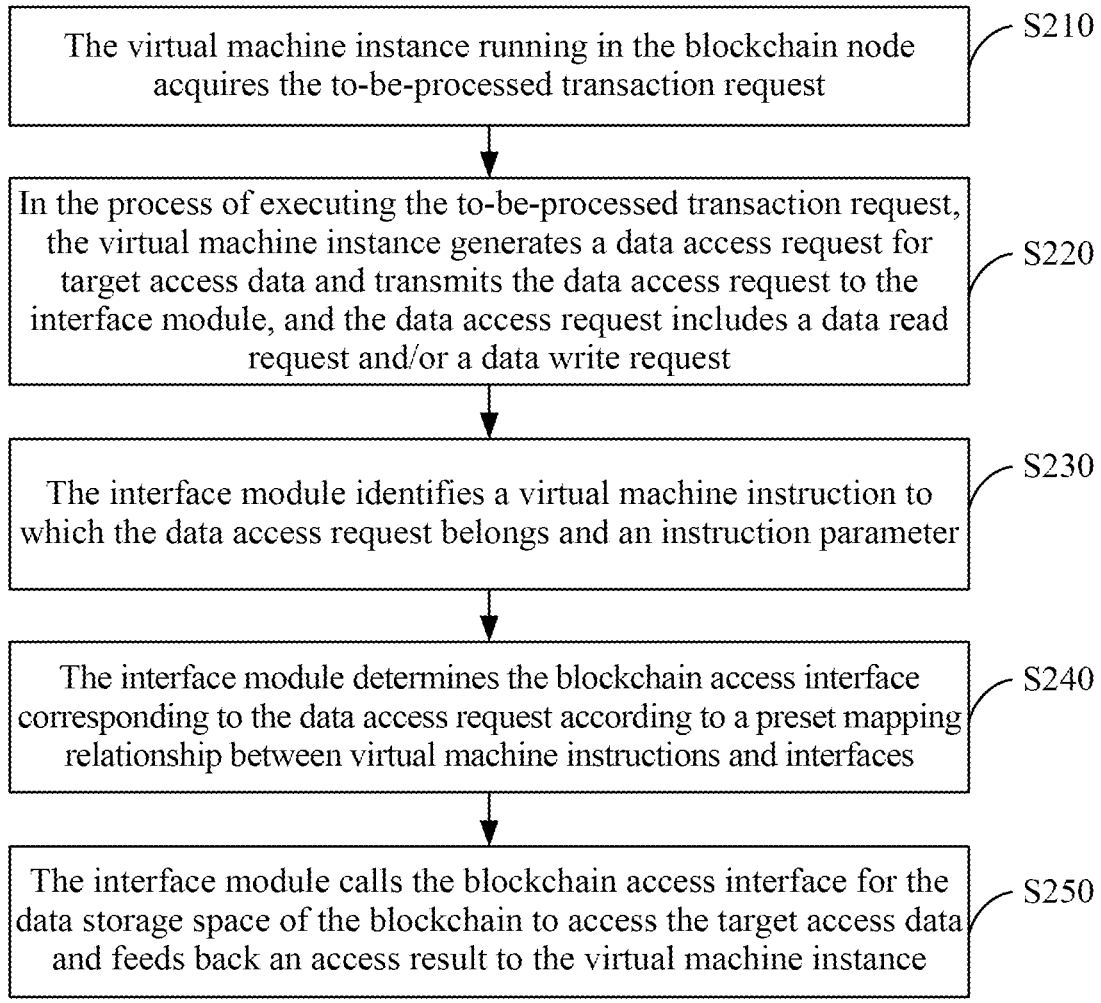
FIG. 2 is a schematic diagram of another Ethereum Virtual Machine-based transaction processing method according to an embodiment of the present disclosure.

FIG. 2 is a schematic diagram of another Ethereum Virtual Machine-based transaction processing method according to an embodiment of the present application. This embodiment is an alternative scheme provided based on the preceding embodiment. This embodiment is a refinement of the step in which the interface module performs the instruction conversion according to the data access request to determine the blockchain access interface corresponding to the function of the data access request.

Referring to FIG. 2, the Ethereum Virtual Machine-based transaction processing method provided in this embodiment includes steps described below.

In S210, the virtual machine instance running in the blockchain node acquires a to-be-processed transaction request.

In S220, in a process of executing the to-be-processed transaction request, the virtual machine instance generates a data access request for target access data and transmits the data access request to the interface module. The data access request includes a data read request and/or a data write request.

In S230, the interface module identifies a virtual machine instruction to which the data access request belongs and an instruction parameter.

The virtual machine instruction and the instruction parameter are generated when the virtual machine instance executes the to-be-processed transaction request. The instruction parameter is a parameter variable included in the virtual machine instruction. The execution of the virtual machine instruction can implement access to the target access data. The target access data includes account data and contract data. Thus, the data access request is a read request and/or a write request for the account data and the contract data.

Since the smart contracts of Ethereum are developed through Geth which is a client of Ethereum in Go language and a necessary tool for the development of the smart contracts of Ethereum, instruction account operation instructions provided by Geth are generally used to manage accounts in Ethereum. Exemplarily, the virtual machine instruction and the instruction parameter corresponding to the data access request may be an account list instruction (geth account list), an account update instruction (geth account update) or an account creation instruction (personal.newAccount ('Your Password')). The contents in both the virtual machine instruction to which the data access request belongs and the instruction parameter are not limited herein and are determined according to actual cases.

In S240, the interface module determines a blockchain access interface corresponding to the data access request according to a preset mapping relationship between virtual machine instructions and interfaces.

An interface mapping relationship refers to a correspondence between virtual machine instructions and blockchain access interfaces. The interface mapping relationship is pre-configured in the interface module by a user according to actual cases.

Since the data access request is directly related to the virtual machine instruction, the blockchain access interface corresponding to the data access request may be determined according to the virtual machine instruction and the interface mapping relationship on the premise that the interface mapping relationship is known.

To avoid a redundant mapping relationship, in an alternative embodiment, one or more virtual machine instructions have an interface mapping relationship with one blockchain access interface.

That is to say, one blockchain access interface corresponds to at least one virtual machine instruction. Different virtual machine instructions may correspond to the same blockchain access interface. An interface mapping relationship between at least one virtual machine instruction and one blockchain access interface is essentially a correspondence between the target access data corresponding to the virtual machine instruction and data corresponding to the blockchain access interface in a data storage space.

In S250, the interface module calls the blockchain access interface for the data storage space of the blockchain to access the target access data and feeds back an access result to the virtual machine instance.

An operation performed on an account generally needs to include multiple steps. In an alternative embodiment, the blockchain access interface has the function of calling another blockchain access interface. Exemplarily, the operation performed on the account is to create a contract account. Since a newly-created contract account is to be used, the newly-created contract account generally needs to be initialized. Therefore, after the interface module calls a contract account creation interface to create the contract account, the contract account creation interface calls a contract bytecode initialization interface to initialize a bytecode in the contract space.

In the embodiment of the present application, the interface module performs the instruction conversion on the data access request based on the mapping relationship and determines the blockchain access interface corresponding to a function of the data access request so that the blockchain is open and componentized, thereby reducing the difficulty of data operations between different blockchains.

This embodiment is an alternative scheme provided based on the preceding embodiments. The category and the function of the blockchain access interface involved in the preceding embodiments are described in detail.

The category of the blockchain access interface includes an account access interface, a storage access interface and a contract operation interface; where the account access interface is used for accessing account data, the contract operation interface is used for operating a contract account, and the storage access interface is used for updating contract data.

A blockchain read interface in the blockchain access interface includes at least one of an intra-contract variable read interface, an account token balance read interface, a contract bytecode read interface, an interface for reading a deal sequence number of an account, an on-chain contract query interface, an on-chain account query interface, or a read interface for reading a hash of a block according to a height of the block.

The intra-contract variable read interface is used for reading an intra-contract variable in the contract data. The account token balance read interface is used for reading an account token balance in the account data. The contract bytecode read interface is used for reading a contract bytecode in the contract account. The interface for reading the deal sequence number of the account is used for reading the deal sequence number in the account data. The on-chain contract query interface is used for querying a smart contract stored on the chain. The on-chain account query interface is used for querying account information stored on the chain. The read interface for reading the hash of the block according to the height of the block is used for reading the hash of the block according to the height of the block.

A blockchain is generally regarded as a vertical stack so that the first block serves as a primary block at the bottom of the stack and then each block is placed over a previous block. The height of the block represents a distance between this block and the primary block. The height of the block may be used as a block identifier for determining a particular block. The hash of the block is a main identifier of the block. A 32-byte hash value obtained through a secondary hash computation on a block header by the secure hash algorithm 256 (SHA256) is referred to as a hash value of the block, which is a digital fingerprint of the block.

In an alternative embodiment, a blockchain write interface in the blockchain access interface includes at least one of a contract account creation interface, a contract bytecode initialization interface, a contract account deletion interface, an intra-contract variable storage interface, an account balance increase interface, or an account balance decrease interface.

The contract account creation interface is used for creating a contract account in the contract space. The contract bytecode initialization interface is used for initializing a bytecode in the contract space. The contract account deletion interface is used for deleting a contract account in the contract space. The intra-contract variable storage interface is used for storing an intra-contract variable. The account balance increase interface is used for increasing an account balance. The account balance decrease interface is used for decreasing an account balance.

Among the preceding interfaces, the account access interface includes a read interface (that is, the account token balance read interface, the interface for reading the deal sequence number of the account and the on-chain account query interface) and a write interface (that is, the account balance increase interface and the account balance decrease interface). The contract operation interface includes a read interface (that is, the contract bytecode read interface, the on-chain contract query interface and the read interface for reading the hash of the block according to the height of the block) and a write interface (that is, the contract account creation interface, the contract bytecode initialization interface and the contract account deletion interface). The storage access interface includes a read interface (that is, the intra-contract variable read interface) and a write interface (that is, the intra-contract variable storage interface).

In the embodiment of the present application, multiple blockchain access interfaces of multiple types are provided in a blockchain where the target access data is stored, which provides convenience for processing the transaction request by a blockchain node where a virtual machine instance runs and improves the coverage of transaction requests processable by the blockchain node of the virtual machine instance.

In the process of processing one to-be-processed transaction request, multiple data access requests may be generated at each link.

For example, the data access request that may be generated through the processing of the to-be-processed transaction request includes at least one of a contract account creation request, a contract bytecode initialization request, a contract account deletion request, an intra-contract variable storage request, an account balance increase request, an account balance decrease request, an intra-contract variable read request, an account token balance read request, a contract bytecode read request, a request for reading a deal sequence number of an account, an on-chain contract query request, an on-chain account query request, a read request for reading a hash of a block according to a height of the block or the like.

Data access requests generated in an ordinary process of processing a business transaction request are described below by way of examples.

1. In the case where the data access request includes the on-chain contract query request and the on-chain account query request, when acquiring the to-be-processed transaction request, the virtual machine instance acquires a contract caller identifier and a to-be-called contract identifier in the to-be-processed transaction request.

The contract caller identifier is information for identifying an identity of a party that calls a smart contract and may be an account identifier. The to-be-called contract identifier is information for identifying the called smart contract. In an embodiment, the to-be-called contract identifier is a contract address or the account identifier.

The virtual machine instance respectively generates the on-chain account query request and the on-chain contract query request of a caller according to the contract caller identifier and the to-be-called contract identifier, and transmits the on-chain account query request and the on-chain contract query request to the interface module.

To determine the validity of the to-be-processed transaction request, the virtual machine instance needs to determine whether an account and a contract identified by the contract caller identifier and the to-be-called contract identifier exist. The virtual machine instance generates the on-chain account query request and the on-chain contract query request of the caller according to the contract caller identifier and the to-be-called contract identifier, respectively, and the virtual machine instance transmits the on-chain account query request and the on-chain contract query request to the interface module. The on-chain account query request is used for querying whether the account identified by the contract caller identifier exists, and correspondingly, the on-chain contract query request is used for querying whether the contract identified by the to-be-called contract identifier exists.

The interface module performs the instruction conversion according to the data access request to determine the on-chain account query interface corresponding to the on-chain account query request and the on-chain contract query interface corresponding to the on-chain contract query request.

In an embodiment, if the account data and the contract data are respectively stored in the account space and the contract space, the interface module calls the on-chain account query interface for the account space of a blockchain to query whether a contract caller account exists on the chain.

After receiving the on-chain account query request, the interface module determines the account space corresponding to the contract caller identifier according to the contract caller identifier in the on-chain account query request and calls the on-chain account query interface for the account space of the blockchain to query whether the contract caller account exists on the chain.

The interface module calls the on-chain contract query interface for the contract space of the blockchain to query whether a to-be-called contract exists on the chain.

After receiving the on-chain contract query request, the interface module determines the contract space corresponding to the to-be-called contract identifier according to the to-be-called contract identifier in the on-chaicontract query request and calls the on-chain contract query interface for the contract space of the blockchain to query whether the to-be-called contract exists on the chain.

The interface module feeds back a query result of both the contract caller account and the to-be-called contract back to the virtual machine instance.

The query result includes the case where the contract caller account exists or does not exist, the case where the to-be-called contract exists or does not exist, and a combination of these two cases. The interface module feeds back the query result to the virtual machine instance. If the query result is that one or both of the contract caller account and the to-be-called contract do not exist, the virtual machine instance feeds back error information for the to-be-processed transaction request.

2. In the case where the data access request is the contract bytecode read request, when acquiring the query result fed back by the interface module that an on-chain account and an on-chain contract exist, the virtual machine instance generates the contract bytecode read request according to the to-be-called contract identifier and transmits the contract bytecode read request to the interface module.

The contract bytecode read request refers to a request for reading a contract bytecode stored in the contract space. If the query result fed back by the interface module to the virtual machine instance is that the on-chain account and the on-chain contract exist, it indicates that the to-be-processed transaction request is valid, and the virtual machine instance generates the contract bytecode read request according to the to-be-called contract identifier and transmits the contract bytecode read request to the interface module.

The interface module performs the instruction conversion according to the data access request to determine the contract bytecode read interface corresponding to the contract bytecode read request.

In an embodiment, if the account data and the contract data are respectively stored in the account space and the contract space, the interface module calls the contract bytecode read interface for the contract space of the blockchain to read a contract bytecode of the to-be-called contract and feeds back the read contract bytecode to the virtual machine instance.

After receiving the contract bytecode read request, the interface module determines the contract space where the contract bytecode is stored according to the contract bytecode read request and calls the contract bytecode read interface for the contract space of the blockchain to read the contract bytecode of the to-be-called contract.

3. In the case where the data access request is the intra-contract variable read request, the virtual machine instance executes the to-be-processed transaction request according to the contract bytecode fed back by the interface module and a contract parameter and a token in the to-be-processed transaction request, generates the intra-contract variable read request and transmits the intra-contract variable read request to the interface module in the process of executing the to-be-processed transaction request. The intra-contract variables include variables and variable values in a running process of a smart contract.

The contract parameter and the token are variables to be inputted to the virtual machine instance when the virtual machine instance executes the contract bytecode. The process of the virtual machine instance executing the to-be-processed transaction request is a process of executing the contract bytecode fed back by the interface module. The virtual machine instance generates the intra-contract variable read request in the process of executing the contract bytecode and transmits the intra-contract variable read request to the interface module.

It is to be noted that not all intra-contract variables need to be stored on the chain. The intra-contract variables include intermediate values generated in the process of executing the contract, and these intermediate values may be covered by other values generated in the process of executing the contract. Exemplarily, a smart contract with a billing accumulation function includes variables A and B, where A is an existing amount and B is an amount accumulated this time. In different deals, A and B have different values. For example, a user initiates a deal in which B (2 dollar) is accumulated on the basis of A (10 dollar). Then, in the above example, A and B are variables, 10 and 2 are values of the variables, and A, B and the values 10 and 2 corresponding to A and B are all intra-contract variables and need to be recorded in the contract space. The variable values corresponding to the variables A and B may change in the process of executing the smart contract. Generally, the variable values in the process are not stored on the chain while the variables A and B and the final variable values corresponding to these two variables are stored on the chain.

The interface module performs the instruction conversion according to the data access request to determine the intra-contract variable read interface corresponding to the intra-contract variable read request.

In an embodiment, if the account data and the contract data are respectively stored in the account space and the contract space, the interface module calls the intra-contract variable read interface for the contract space of the blockchain to read a value of the intra-contract variable and feeds back the read value to the virtual machine instance.

After receiving the intra-contract variable read request, the interface module determines the contract space where the intra-contract variable is stored according to the intra-contract variable read request, calls the intra-contract variable read interface for the contract space of the blockchain to read the intra-contract variable of the to-be-called contract, and feeds back the read intra-contract variable to the virtual machine instance.

4. In the case where the data access request is the intra-contract variable storage request, the virtual machine instance generates the intra-contract variable storage request and transmits the intra-contract variable storage request to the interface module in the process of executing the to-be-processed transaction request.

The intra-contract variable storage request is a request for storing an intra-contract variable in the contract space. The virtual machine instance generates a data processing result in the process of executing the to-be-processed transaction request. If the data processing result needs to be stored in the contract space, the virtual machine instance generates the intra-contract variable storage request and transmits the intra-contract variable storage request to the interface module.

The interface module performs the instruction conversion according to the data access request to determine the intra-contract variable storage interface corresponding to the intra-contract variable storage request.

In an embodiment, if the account data and the contract data are respectively stored in the account space and the contract space, the interface module calls the intra-contract variable storage interface for the contract space of the blockchain to write a value of the intra-contract variable.

After receiving the intra-contract variable storage request, the interface module determines a target contract space for the intra-contract variable according to the intra-contract variable storage request and calls the intra-contract variable storage interface for the contract space of the blockchain to write the value of the intra-contract variable into the contract space.

In the embodiment of the present application, the virtual machine instance and the interface module coordinate with each other to jointly complete the to-be-processed transaction request so that data access operations between different blockchains are achieved, the migration of an Ethereum Virtual Machine to another blockchain system is achieved, and the compatibility with Ethereum and other blockchain technologies is improved.

Figure 3:
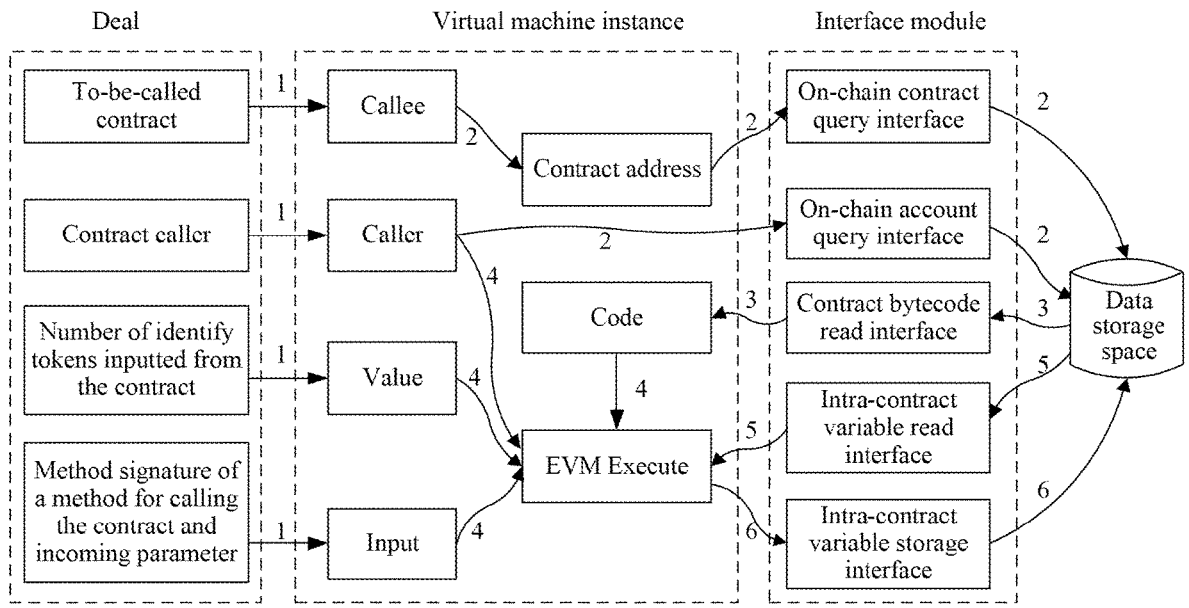
FIG. 3 is a schematic diagram of another Ethereum Virtual Machine-based transaction processing method according to an embodiment of the present disclosure.

FIG. 3 is a schematic diagram of an Ethereum Virtual Machine-based transaction processing method according to an embodiment of the present application. This embodiment is an optimization of the preceding embodiments and is an exemplary embodiment. A complete process of executing a to-be-processed transaction request is described.

Referring to FIG. 3, the Ethereum Virtual Machine-based transaction processing method provided in this embodiment includes steps described below.

In step 1, the virtual machine instance running in the blockchain node acquires the to-be-processed transaction request.

In an embodiment, the to-be-processed transaction request is a deal transaction request. The deal transaction request includes four parameters: a contract caller (From), a called contract (To), an incoming token for calling the contract (Amout) and a method signature of a method for calling the contract and an incoming parameter (Data). The blockchain node inputs From, To, Amout and Data in the deal transaction request to the virtual machine instance, which exist as Caller, Callee, Value and Input in the virtual machine instance.

The virtual machine instance running in the blockchain node acquires the to-be-processed transaction request initiated by the contract caller. The to-be-processed transaction request includes a contract caller identifier, a to-be-called contract identifier, a contract parameter and a token. In the case where the to-be-processed transaction request is the deal transaction request, Caller in the virtual machine instance is the contract caller identifier, Callee is the to-be-called contract identifier, Value is the token, and Input is the contract parameter.

In step 2, the virtual machine instance calls the on-chain account query interface (Acc Exists) and the on-chain contract query interface (Contract Exists) in the interface module according to Caller and Callee to query whether the to-be-called contract and the contract caller exist in the data storage space of the blockchain, respectively.

After the virtual machine instance receives the deal transaction request, the virtual machine instance generates an on-chain account query request and an on-chain contract query request of the caller respectively according to the contract caller identifier and the to-be-called contract identifier in the deal transaction request and transmits the on-chain account query request and the on-chain contract query request to the interface module. Interfaces for the virtual machine instance are encapsulated in the interface module. The interface module calls the on-chain account query interface for the account space of the blockchain according to the on-chain account query request to query whether a contract caller account exists on the chain. The interface module calls the on-chain contract query interface for the contract space of the blockchain according to the on-chain contract query request to query whether the to-be-called contract exists on the chain. The interface module feeds back a query result of both the contract caller account and the to-be-called contract to the virtual machine instance.

In step 3, if both the contract caller and the to-be-called contract exist in the data storage space of the blockchain, the virtual machine instance calls the contract bytecode read interface (Get Code) in the interface module to acquire a contract bytecode (Code) stored in the contract space (Contract Store).

When acquiring the query result fed back by the interface module that the on-chain account and the on-chain contract exist, the virtual machine instance generates a contract bytecode read request according to the to-be-called contract identifier and transmits the contract bytecode read request to the interface module. The interface module calls the contract bytecode read interface for the contract space of the blockchain, reads the contract bytecode of the to-be-called contract, and feeds back the read contract bytecode to the virtual machine instance.

In step 4, the virtual machine instance transmits Caller, Value, Input and Code to a virtual machine instance execution module (EVM Execute) for EVM Execute to execute the deal transaction request.

In steps 5 and 6, EVM Execute executes the deal transaction request according to Caller, Value, Input and Code, and in the process of executing the deal transaction request, the reading and storage of intra-contract variables are involved so that a contract state is changed.

The virtual machine instance executes the to-be-processed transaction request according to the contract bytecode fed back by the interface module and the contract parameter and the token in the to-be-processed transaction request, and in the process of executing the to-be-processed transaction request, the virtual machine instance generates the intra-contract variable read request and transmits the intra-contract variable read request to the interface module. The intra-contract variables include variables and variable values in a running process of a smart contract. The interface module calls the intra-contract variable read interface for the contract space of the blockchain, reads a value of an intra-contract variable, and feeds back the read value to the virtual machine instance.

The virtual machine instance generates an intra-contract variable storage request and transmits the intra-contract variable storage request to the interface module in the process of executing the to-be-processed transaction request. The interface module calls the intra-contract variable storage interface for the contract space of the blockchain to write the value of the intra-contract variable. It is to be noted that connection lines and reference numerals in FIG. 3 indicate data flows in steps identified by the reference numerals.

In the embodiment of the present application, the virtual machine instance generates a data access request for target access data and transmits the data access request to the interface module in the process of executing the to-be-processed transaction request, and the interface module calls the blockchain access interface for the data storage space of the blockchain to access the target access data and feeds back the access result to the virtual machine instance. In the present application, the virtual machine instance and the interface module coordinate with each other to jointly complete the to-be-processed transaction request so that data access operations between different blockchains are achieved, the migration of an Ethereum Virtual Machine to another blockchain system is achieved, and the compatibility with Ethereum and other blockchain technologies is improved.

Figure 4:
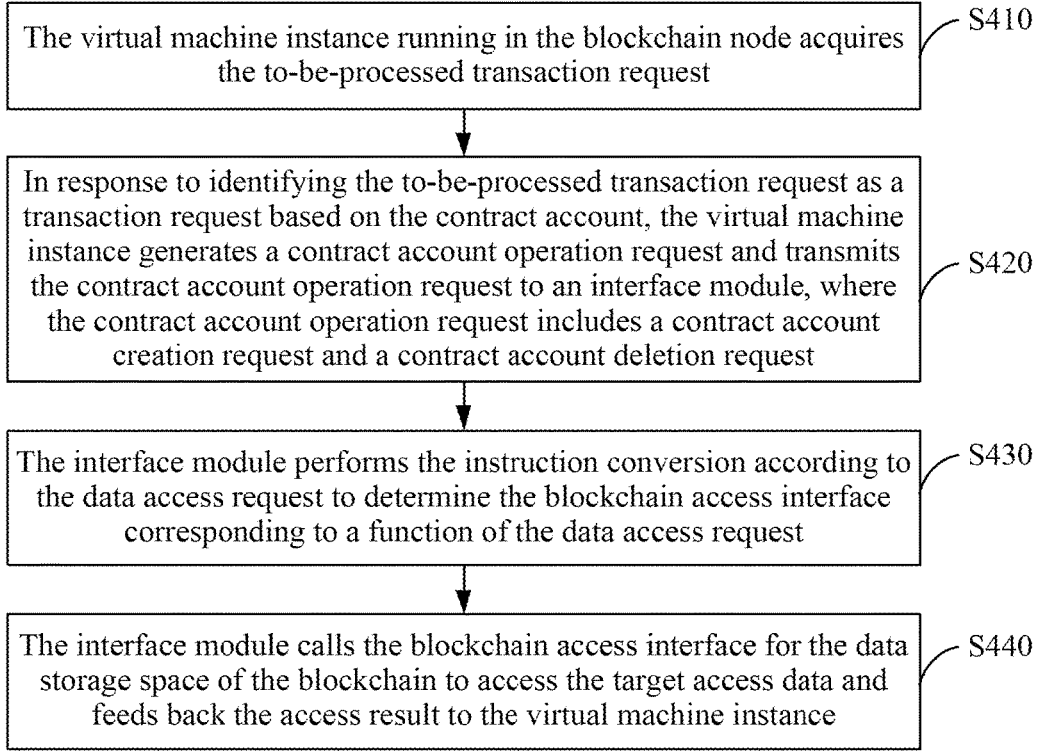
FIG. 4 is a schematic diagram of an Ethereum Virtual Machine-based transaction processing flow according to an embodiment of the present disclosure.

FIG. 4 is a schematic diagram of another Ethereum Virtual Machine-based transaction processing method according to an embodiment of the present application. This embodiment is an alternative scheme provided based on the preceding embodiment. This embodiment is a refinement of a process of executing a to-be-processed transaction request in the case where the to-be-processed transaction request is a transaction request based on a contract account. FIG. 4 illustrates the whole process of executing the to-be-processed transaction request in the case where the to-be-processed transaction request is the transaction request based on the contract account. Referring to FIG. 4, the Ethereum Virtual Machine-based transaction processing method provided in this embodiment includes steps described below.

In S410, the virtual machine instance running in the blockchain node acquires the to-be-processed transaction request.

In S420, in response to identifying the to-be-processed transaction request as the transaction request based on the contract account, the virtual machine instance generates a contract account operation request and transmits the contract account operation request to the interface module, where the contract account operation request includes a contract account creation request and a contract account deletion request.

In S430, the interface module performs the instruction conversion according to the data access request to determine the blockchain access interface corresponding to the function of the data access request.

In S440, the interface module calls the blockchain access interface for the data storage space of the blockchain to access the target access data and feeds back an access result to the virtual machine instance.

The process of the virtual machine instance executing the to-be-processed transaction request in the case where the contract account operation request is the contract account creation request and the process of the virtual machine instance executing the to-be-processed transaction request in the case where the contract account operation request is the contract account deletion request are described below in detail.

In an embodiment, the process of the virtual machine instance executing the to-be-processed transaction request in the case where the contract account operation request is the contract account creation request is described below.

In step 1, in response to identifying the to-be-processed transaction request as the contract account creation request based on the contract account, the virtual machine instance transmits the contract account creation request to the interface module.

The contract account creation request based on the contract account refers to a request for creating a new contract account. The contract account creation request includes writing account data and contract data of the newly-created contract account. The contract account creation request based on the contract account includes writing the account data of the newly-created contract account and a smart contract.

The virtual machine instance executes the contract account creation request based on the contract account to generate the data access request for a target contract account. Since the contract account includes the contract data and the account data, that is, an account data write request and a contract data write request are generated for the contract account. The account data write request is to write the account data of the contract account into the account space. The contract data write request is to write the contract data of the contract account into the contract space. The contract space and the account space are isolated in space.

In step 2, the interface module performs the instruction conversion according to the data access request to determine the contract account creation interface corresponding to the contract account creation request.

The interface module identifies a virtual machine instruction to which the data access request belongs and an instruction parameter and determines the blockchain access interface corresponding to the data access request according to a preset mapping relationship between virtual machine instructions and interfaces.

In step 3, the interface module calls the contract account creation interface according to the contract account creation request, creates the contract account in the account space, writes the account data of the contract account, and creates the contract space.

Generally, the account space exists on the blockchain. Therefore, after receiving the contract account creation request, the interface module may determine the target account space according to the contract account creation request and call the contract account creation interface for the account space of the blockchain to create the contract account and write the account data into the account space. However, the contract space is a space for storing the contract data and needs to be created when the contract account is created.

In step 4, in a process of executing the contract account creation interface, the interface module calls the contract bytecode initialization interface to compile a smart contract to be created, form a contract bytecode, and write the contract bytecode into the contract space.

The contract bytecode initialization interface is an interface for compiling the smart contract to be created to obtain the contract bytecode and writing the bytecode into the contract space.

After the contract space is created, the contract data in the contract space needs to be initialized. In the process of executing the contract account creation interface, the interface module calls the contract bytecode initialization interface, compiles the smart contract to form the contract bytecode, and writes the contract bytecode into the contract space.

In step 5, in the process of executing the contract account creation interface, the interface module calls the intra-contract variable storage interface and creates and stores intra-contract variables of the smart contract in the contract space.

Since there are variables in the smart contract and these variables are to be operated in the process of executing the smart contract, the variables and variable values involved in the smart contract also need to be stored in the contract space. In the process of executing the contract account creation interface, the interface module calls the intra-contract variable storage interface and creates and stores the intra-contract variables of the smart contract in the contract space.

According to the technical scheme in the embodiment of the present application, a contract-account creation scheme based on the contract account is provided through coordination of the virtual machine instance and the interface module, which can isolate the account space and the contract space and be used for a user to create a contract account according to a requirement of the user, thereby improving business expansibility of the blockchain.

In an embodiment, the process of the virtual machine instance executing the to-be-processed transaction request in the case where the contract account operation request is the contract account deletion request is described below.

In step 1, the virtual machine instance running in the blockchain node acquires the to-be-processed transaction request.

In step 2, in response to identifying the to-be-processed transaction request as the contract account deletion request based on the contract account, the virtual machine instance transmits the contract account deletion request to the interface module.

The contract account deletion request based on the contract account refers to a request for deleting an existing contract account from contract accounts. The contract account deletion request based on the contract account includes deleting account data and contract data of a target contract account. The contract account deletion request based on the contract account includes an account identifier of a to-be-deleted contract account.

The virtual machine instance executes the contract account deletion request based on the contract account to generate the data access request for the target contract account. Since the contract account includes the contract data and the account data, that is, the account data write request and the contract data write request are generated for the contract account. The account data write request is to write the account data of the contract account into the account space. The contract data write request is to write the contract data of the contract account into the contract space. The contract space and the account space are isolated in space. Deleting the contract account may be emptying both the contract data and the account data in the contract account or may be emptying only the account identifier fields of both the contract data and the account data so that the contract account cannot be indexed by other users, thereby achieving the purpose of deleting the contract account.

In step 3, the interface module performs the instruction conversion according to the data access request to determine the contract account deletion interface corresponding to the contract account deletion request.

The interface module identifies the virtual machine instruction to which the data access request belongs and the instruction parameter and determines the blockchain access interface corresponding to the data access request according to the preset mapping relationship between virtual machine instructions and interfaces.

In step 4, the interface module calls the contract account deletion interface according to the contract account deletion request, deletes account data of a to-be-deleted contract account in the account space, and deletes contract data of the to-be-deleted contract account in the contract space.

Since the contract account includes the contract data and the account data, and the contract data and the account data are respectively stored in the contract space and the account space, when deleting the contract account, the interface module calls the contract account deletion interface according to the contract account deletion request, deletes the account data of the to-be-deleted contract account in the account space, and deletes the contract data of the to-be-deleted contract account in the contract space.

In the embodiment of the present application, a contract-account deletion scheme based on the contract account is provided through the coordination of the virtual machine instance and the interface module so that the user can delete the contract account when the user does not expect the contract account to be used by another user or when the contract account is discarded, thereby avoiding the waste of block storage resources and improving the privacy of the contract account at the same time.

Figure 5:
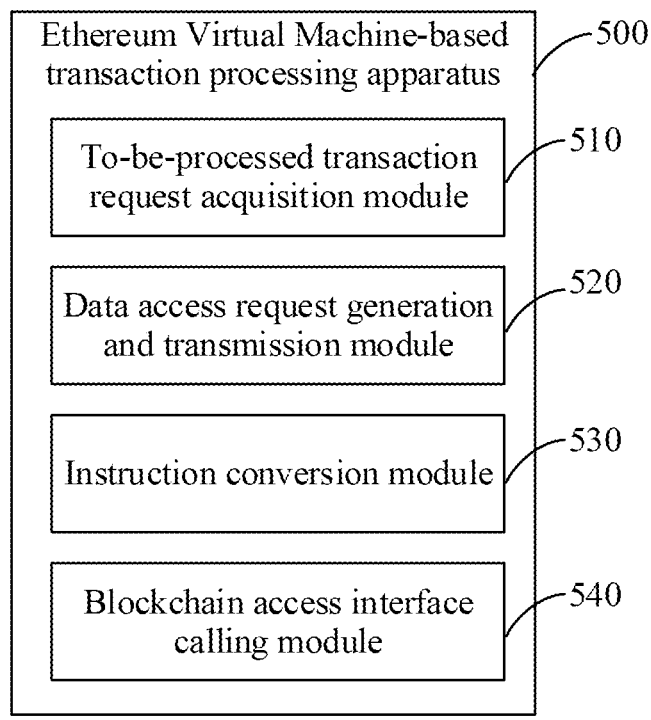
FIG. 5 is a schematic diagram of an Ethereum Virtual Machine-based transaction processing apparatus according to an embodiment of the present disclosure.

FIG. 5 is a schematic diagram of an Ethereum Virtual Machine-based transaction processing apparatus according to an embodiment of the present application. Referring to FIG. 5, the embodiment of the present application discloses the Ethereum Virtual Machine-based transaction processing apparatus 500. The apparatus 500 may include a to-be-processed transaction request acquisition module 510, a data access request generation and transmission module 520, an instruction conversion module 530 and a blockchain access interface calling module 540.

The to-be-processed transaction request acquisition module 510 is configured to cause a virtual machine instance running in a blockchain node to acquire a to-be-processed transaction request.

The data access request generation and transmission module 520 is configured to cause the virtual machine instance to: in a process of executing the to-be-processed transaction request, generate a data access request for target access data and transmit the data access request to an interface module, where the data access request includes a data read request and/or a data write request.

The instruction conversion module 530 is configured to cause the interface module to perform instruction conversion according to the data access request to determine a blockchain access interface corresponding to a function of the data access request.

The blockchain access interface calling module 540 is configured to cause the interface module to call the blockchain access interface for a data storage space of a blockchain to access the target access data and feed back an access result to the virtual machine instance.

According to the technical scheme in the embodiment of the present application, when an Ethereum Virtual Machine is migrated to another blockchain system for transaction processing, the interface module is constructed to perform the instruction conversion on the data access request in the form of an Ethereum Virtual Machine instruction and determine the blockchain access interface corresponding to the function of the data access request so that a heterogeneous data storage space can be accessed. Therefore, the blockchain is open and componentized, thereby reducing the difficulty in migrating the Ethereum Virtual Machine to another blockchain system. The embodiment of the present application achieves the migration of the Ethereum Virtual Machine to another blockchain system and improves the compatibility with Ethereum and other blockchain technologies through the construction of the interface module.

In an embodiment, the instruction conversion module includes a data access request identification submodule and a blockchain access interface determination submodule. The data access request identification submodule is configured to cause the interface module to identify a virtual machine instruction to which the data access request belongs and instruction parameters.

The blockchain access interface determination submodule is configured to cause the interface module to determine the blockchain access interface corresponding to the data access request according to a preset mapping relationship between virtual machine instructions and interfaces.

In an embodiment, one or more virtual machine instructions have an interface mapping relationship with one blockchain access interface.

In an embodiment, the blockchain access interface has a function of calling another blockchain access interface.

In an embodiment, the target access data includes account data and contract data.

A category of the blockchain access interface includes an account access interface, a storage access interface and a contract operation interface.

The account access interface is used for accessing the account data, the contract operation interface is used for operating a contract account, and the storage access interface is used for updating the contract data.

In an embodiment, a blockchain read interface in the blockchain access interface includes at least one of an intra-contract variable read interface, an account token balance read interface, a contract bytecode read interface, an interface for reading a deal sequence number of an account, an on-chain contract query interface, an on-chain account query interface, or a read interface for reading a hash of a block according to a height of the block.

In an embodiment, the data access request generation and transmission module includes an identifier information acquisition submodule and a query request generation submodule. The identifier information acquisition submodule is configured to cause the virtual machine instance to acquire a contract caller identifier and a to-be-called contract identifier in the to-be-processed transaction request in response to acquiring the to-be-processed transaction request.

The query request generation submodule is configured to cause the virtual machine instance to generate an on-chain account query request and an on-chain contract query request of a caller according to the contract caller identifier and the to-be-called contract identifier, respectively, and transmit the on-chain account query request and the on-chain contract query request to the interface module.

In an embodiment, the data access request generation and transmission module is configured to cause the virtual machine instance to: in response to acquiring a query result fed back by the interface module that an on-chain account and an on-chain contract exist, generate a contract bytecode read request according to the to-be-called contract identifier and transmit the contract bytecode read request to the interface module.

In an embodiment, the data access request generation and transmission module is configured to cause the virtual machine instance to execute the to-be-processed transaction request according to a contract bytecode fed back by the interface module and a contract parameter and a token in the to-be-processed transaction request, and in the process of executing the to-be-processed transaction request, generate an intra-contract variable read request and transmit the intra-contract variable read request to the interface module.

The intra-contract variables include variables and variable values in a running process of a smart contract.

In an embodiment, a blockchain write interface in the blockchain access interface includes at least one of a contract account creation interface, a contract bytecode initialization interface, a contract account deletion interface, an intra-contract variable storage interface, an account balance increase interface, or an account balance decrease interface.

In an embodiment, the data access request generation and transmission module includes an intra-contract variable storage request generation module configured to cause the virtual machine instance to: in the process of executing the to-be-processed transaction request, generate an intra-contract variable storage request and transmit the intra-contract variable storage request to the interface module. The intra-contract variables include variables and variable values in the running process of the smart contract.

In an embodiment, the data access request generation and transmission module is configured to cause the virtual machine instance to: in response to identifying the to-be-processed transaction request as a transaction request based on the contract account, generate a contract account operation request and transmit the contract account operation request to the interface module. The contract account operation request includes a contract account creation request and a contract account deletion request.

The Ethereum Virtual Machine-based transaction processing apparatus provided in this embodiment of the present application can perform the Ethereum Virtual Machine-based transaction processing method provided in any one of embodiments of the present application and has function modules and beneficial effects corresponding to the performed Ethereum Virtual Machine-based transaction processing method.

According to embodiments of the present application, the present application further provides an electronic device, a readable storage medium and a computer program product.

Figure 6:
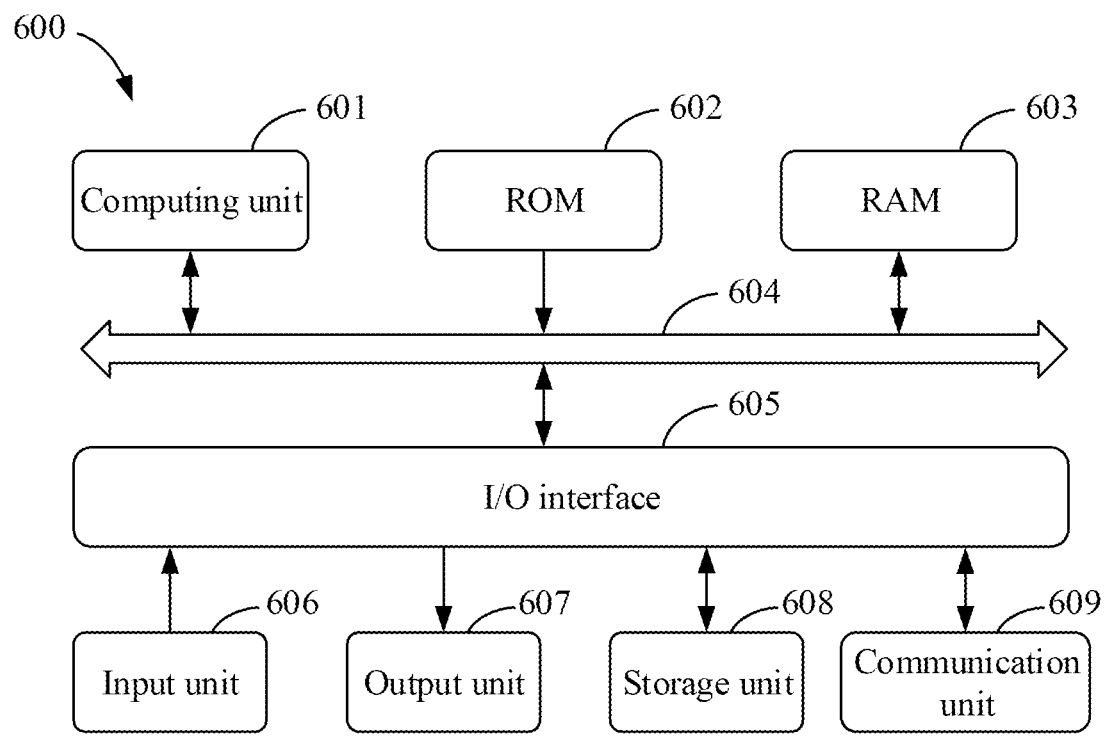
FIG. 6 is a block diagram of an electronic device for implementing an Ethereum Virtual Machine-based transaction processing method according to an embodiment of the present disclosure.

FIG. 6 is a block diagram illustrative of an exemplary electronic device 600 that may be used for implementing embodiments of the present application. Electronic devices are intended to represent various forms of digital computers, for example, laptop computers, desktop computers, worktables, personal digital assistants, servers, blade servers, mainframe computers and other applicable computers. Electronic devices may further represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 6, the device 600 includes a computing unit 601. The computing unit 601 may perform various types of appropriate operations and processing based on a computer program stored in a read-only memory (ROM) 602 or a computer program loaded from a storage unit 608 to a random-access memory (RAM) 603. Various programs and data required for operations of the device 600 may also be stored in the RAM 603. The computing unit 601, the ROM 602 and the RAM 603 are connected to each other through a bus 604. An input/output (I/O) interface 605 is also connected to the bus 604.

Multiple components in the electronic device 600 are connected to the I/O interface 605. The multiple components include an input unit 606 such as a keyboard and a mouse, an output unit 607 such as various types of displays and speakers, the storage unit 608 such as a magnetic disk and an optical disk, and a communication unit 609 such as a network card, a modem and a wireless communication transceiver. The communication unit 609 allows the device 600 to exchange information/data with other devices over a computer network such as the Internet and/or various telecommunications networks.

The computing unit 601 may be various general-purpose and/or dedicated processing components having processing and computing capabilities. Some examples of the computing unit 601 include, but are not limited to, central processing units (CPUs), graphics processing units (GPUs), various dedicated artificial intelligence (AI) computing chips, various computing units running machine learning models and algorithms, digital signal processors (DSPs) and any suitable processors, controllers and microcontrollers. The computing unit 601 performs various methods and processing described above, such as the Ethereum Virtual Machine-based transaction processing method. For example, in some embodiments, the Ethereum Virtual Machine-based transaction processing method may be implemented as a computer software program tangibly contained in a machine-readable medium such as the storage unit 608. In some embodiments, part or all of a computer program may be loaded and/or installed on the device 600 via the ROM 602 and/or the communication unit 609. When the computer program is loaded onto the RAM 603 and executed by the computing unit 601, one or more steps of the preceding Ethereum Virtual Machine-based transaction processing method may be performed. Alternatively, in other embodiments, the computing unit 601 may be configured, in any other suitable manner (for example, by means of firmware), to perform the Ethereum Virtual Machine-based transaction processing method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting data and instructions to the memory system, the at least one input device and the at least one output device.

Program codes for implementing the methods of the present disclosure may be compiled in any combination of one or more programming languages. These program codes may be provided for a processor or controller of a general-purpose computer, a dedicated computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with a system, apparatus or device that executes instructions. The machine-readable medium may be a machine-readable signal medium or a machine-readable storage medium. Machine-readable media may include, but are not limited to, electronic, magnetic, optical, electromagnetic, infrared or semiconductor systems, apparatuses or devices or any suitable combinations thereof. More examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship with each other. The server may be a cloud server, also referred to as a cloud computing server or a cloud host, which is a host product in a cloud computing service system, so as to solve the defects of difficult management and weak business scalability in traditional physical hosts and virtual private server (VPS) services.

It is to be understood that various forms of the preceding flows may be used, with steps reordered, added or removed. For example, the steps described in the present disclosure may be executed in parallel, in sequence or in a different order as long as the desired result of the technical scheme disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. An Ethereum Virtual Machine-based transaction processing method, the method being applied to a blockchain node and comprising:
    acquiring, by a virtual machine instance running in the blockchain node, a to-be-processed transaction request;
    in a process of executing the to-be-processed transaction request, generating, by the virtual machine instance, a data access request for target access data and transmitting the data access request to an interface module, wherein the data access request comprises at least one of a data read request or a data write request, and wherein the data access request generated by the virtual machine instance exists in a form of an Ethereum Virtual Machine instruction;
    performing, by the interface module, instruction conversion according to the data access request to determine a blockchain access interface corresponding to a function of the data access request, wherein the interface module is configured to convert the Ethereum Virtual Machine instruction that is unsupported reading and writing the target access data in a non-Ethernet blockchain into an instruction that is supported reading and writing the target access data in the non-Ethernet blockchain; and
    calling, by the interface module, the blockchain access interface for a data storage space of a blockchain to access the target access data and feeding back an access result to the virtual machine instance.

2. The method of claim 1, wherein performing, by the interface module, the instruction conversion according to the data access request to determine the blockchain access interface corresponding to the function of the data access request comprises:
    identifying, by the interface module, a virtual machine instruction to which the data access request belongs and an instruction parameter; and
    determining, by the interface module, the blockchain access interface corresponding to the data access request according to a preset mapping relationship between virtual machine instructions and interfaces.

3. The method of claim 2, wherein at least one virtual machine instruction has an interface mapping relationship with one blockchain access interface.

4. The method of claim 1, wherein the blockchain access interface has a function of calling another blockchain access interface.

5. The method of claim 1, wherein the target access data comprises account data and contract data; and a category of the blockchain access interface comprises an account access interface, a storage access interface and a contract operation interface;
    wherein the account access interface is used for accessing the account data, the contract operation interface is used for operating a contract account, and the storage access interface is used for updating the contract data.

6. The method of claim 5, wherein a blockchain read interface in the blockchain access interface comprises at least one of:
- an intra-contract variable read interface;
- an account token balance read interface;
- a contract bytecode read interface;
- an interface for reading a deal sequence number of an account;
- an on-chain contract query interface;
- an on-chain account query interface; or
- a read interface for reading a hash of a block according to a height of the block.

7. The method of claim 6, wherein in the process of executing the to-be-processed transaction request, generating, by the virtual machine instance, the data access request for the target access data and transmitting the data access request to the interface module comprises:
- in response to acquiring the to-be-processed transaction request, acquiring, by the virtual machine instance, a contract caller identifier and a to-be-called contract identifier in the to-be-processed transaction request; and
- generating, by the virtual machine instance, an on-chain account query request and an on-chain contract query request of a caller according to the contract caller identifier and the to-be-called contract identifier, respectively, and transmitting the on-chain account query request and the on- chain contract query request to the interface module.

8. The method of claim 7, wherein in the process of executing the to-be- processed transaction request, generating, by the virtual machine instance, the data access request for the target access data and transmitting the data access request to the interface module comprises:
- in response to acquiring a query result fed back by the interface module that an on-chain account and an on-chain contract exist, generating, by the virtual machine instance, a contract bytecode read request according to the to-be-called contract identifier and transmitting the contract bytecode read request to the interface module.

9. The method of claim 8, wherein in the process of executing the to-be- processed transaction request, generating, by the virtual machine instance, the data access request for the target access data and transmitting the data access request to the interface module comprises:
- executing, by the virtual machine instance, the to-be-processed transaction request according to a contract bytecode fed back by the interface module and a contract parameter and a token in the to-be-processed transaction request, and in the process of executing the to-be-processed transaction request, generating an intra-contract variable read request and transmitting the intra-contract variable read request to the interface module;
- wherein intra-contract variables comprise variables and variable values in a running process of a smart contract.

10. The method of claim 5, wherein a blockchain write interface in the blockchain access interface comprises at least one of:
- a contract account creation interface;
- a contract bytecode initialization interface;
- a contract account deletion interface;
- an intra-contract variable storage interface;
- an account balance increase interface; or
- an account balance decrease interface.

11. The method of claim 10, wherein in the process of executing the to-be-processed transaction request, generating, by the virtual machine instance, the data access request for the target access data and transmitting the data access request to the interface module comprises:
- in the process of executing the to-be-processed transaction request, generating, by the virtual machine instance, an intra-contract variable storage request and transmitting the intra-contract variable storage request to the interface module;
- wherein intra-contract variables comprise variables and variable values in a running process of a smart contract.

12. The method of claim 10, wherein in the process of executing the to-be-processed transaction request, generating, by the virtual machine instance, the data access request for the target access data and transmitting the data access request to the interface module comprises:
- in response to identifying the to-be-processed transaction request as a transaction request based on the contract account, generating, by the virtual machine instance, a contract account operation request and transmitting the contract account operation request to the interface module; wherein the contract account operation request comprises a contract account creation request and a contract account deletion request.

13. An electronic device, comprising:
- at least one processor; and
- a memory communicatively connected to the at least one processor;
- wherein the memory stores an instruction executable by the at least one processor, the instruction is executed by the at least one processor to enable the at least one processor to implement the following steps:
- acquiring, by a virtual machine instance running in the blockchain node, a to-be-processed transaction request;
- in a process of executing the to-be-processed transaction request, generating, by the virtual machine instance, a data access request for target access data and transmitting the data access request to an interface module, wherein the data access request comprises at least one of a data read request or a data write request, and wherein the data access request generated by the virtual machine instance exists in a form of an Ethereum Virtual Machine instruction;
- performing, by the interface module, instruction conversion according to the data access request to determine a blockchain access interface corresponding to a function of the data access request, wherein the interface module is configured to convert the Ethereum Virtual Machine instruction that is unsupported reading and writing the target access data in a non- Ethernet blockchain into an instruction that is supported reading and writing the target access data in the non-Ethernet blockchain; and
- calling, by the interface module, the blockchain access interface for a data storage space of a blockchain to access the target access data and feeding back an access result to the virtual machine instance.

14. The electronic device of claim 13, wherein the instruction is executed by the at least one processor to enable the at least one processor to implement performing, by the interface module, the instruction conversion according to the data access request to determine the blockchain access interface corresponding to the function of the data access request by:

identifying, by the interface module, a virtual machine instruction to which the data access request belongs and an instruction parameter; and determining, by the interface module, the blockchain access interface corresponding to the data access request according to a preset mapping relationship between virtual machine instructions and interfaces.

15. The electronic device of claim 13, wherein at least one virtual machine instruction has an interface mapping relationship with one blockchain access interface.

16. The electronic device of claim 13, wherein the blockchain access interface has a function of calling another blockchain access interface.

17. The electronic device of claim 13, wherein the target access data comprises account data and contract data; and a category of the blockchain access interface comprises an account access interface, a storage access interface and a contract operation interface;

wherein the account access interface is used for accessing the account data, the contract operation interface is used for operating a contract account, and the storage access interface is used for updating the contract data.

18. The electronic device of claim 17, wherein a blockchain read interface in the blockchain access interface comprises at least one of:

an intra-contract variable read interface;

an account token balance read interface;

a contract bytecode read interface;

an interface for reading a deal sequence number of an account;

an on-chain contract query interface;

an on-chain account query interface; or a read interface for reading a hash of a block according to a height of the block.

19. A non-transitory computer-readable storage medium storing a computer instruction, wherein the computer instruction is configured to cause a computer to implement the following steps:

acquiring, by a virtual machine instance running in the blockchain node, a to-be-processed transaction request;

in a process of executing the to-be-processed transaction request, generating, by the virtual machine instance, a data access request for target access data and transmitting the data access request to an interface module, wherein the data access request comprises at least one of a data read request or a data write request, and wherein the data access request generated by the virtual machine instance exists in a form of an Ethereum Virtual Machine instruction;

performing, by the interface module, instruction conversion according to the data access request to determine a blockchain access interface corresponding to a function of the data access request, wherein the interface module is configured to convert the Ethereum Virtual Machine instruction that is unsupported reading and writing the target access data in a non-Ethernet blockchain into an instruction that is supported reading and writing the target access data in the non-Ethernet blockchain; and calling, by the interface module, the blockchain access interface for a data storage space of a blockchain to access the target access data and feeding back an access result to the virtual machine instance.

* * * * *